(12) United States Patent
Rofougaran (10) Patent No.: US 8,260,216 B2
(45) Date of Patent: Sep. 4, 2012

(54) APPARATUS WITH RFID TRANSCEIVER AND WIRELESS COMMUNICATION MODULE

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 669 days.

(21) Appl. No.: 12/326,965

(22) Filed: Dec. 3, 2008

(65) Prior Publication Data

US 2010/0136923 A1    Jun. 3, 2010

(51) Int. Cl.
*H04B 1/40* (2006.01)
(52) U.S. Cl. .......................................... 455/88
(58) Field of Classification Search ............ 455/88
See application file for complete search history.

(56) References Cited

U.S. PATENT DOCUMENTS

2006/0145815 A1* 7/2006 Lanzieri et al. ............. 340/10.2
* cited by examiner

*Primary Examiner* — Lincoln Donovan
*Assistant Examiner* — Daniel Rojas
(74) *Attorney, Agent, or Firm* — Garlick & Markison; Bruce E. Garlick (57) ABSTRACT

An apparatus includes an RFID transceiver, a processing module, and a wireless communication module. The RFID transceiver receives an RFID signal from a device and obtains communication information from the RFID signal. The processing module is operable to: determine a wireless communication protocol and device identification information from the communication information; receive an outbound data request; and generate outbound data in accordance with the outbound data request, wherein the outbound data includes at least a portion of the identification information. The wireless communication module converts outbound data into an outbound wireless signal in accordance with the wireless communication protocol.

17 Claims, 10 Drawing Sheets

APPARATUS WITH RFID TRANSCEIVER AND WIRELESS COMMUNICATION MODULE

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to an apparatus that is used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

Integration has also taken place with remote control devices. For example, many remote controllers (of a television, for example) have the ability to function as the remote controller for other devices such as a cable box, satellite receiver, etc. In many instances, the remote controller is pre-programmed with the remote control instruction set, or portion thereof, of the other device and the user of the remote controller performs a series of operations to set up the remote control of the other device. In many other instances, however, the remote controller is not pre-programmed with the remote control instruction set, which requires the user to download the instruction set, port it to the remote controller, and then attempt to set up the remote control function. This can be a very burdensome process, often with little success.

Therefore, a need exists for a communication apparatus that at least partially overcomes one or more of the issues discussed above.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
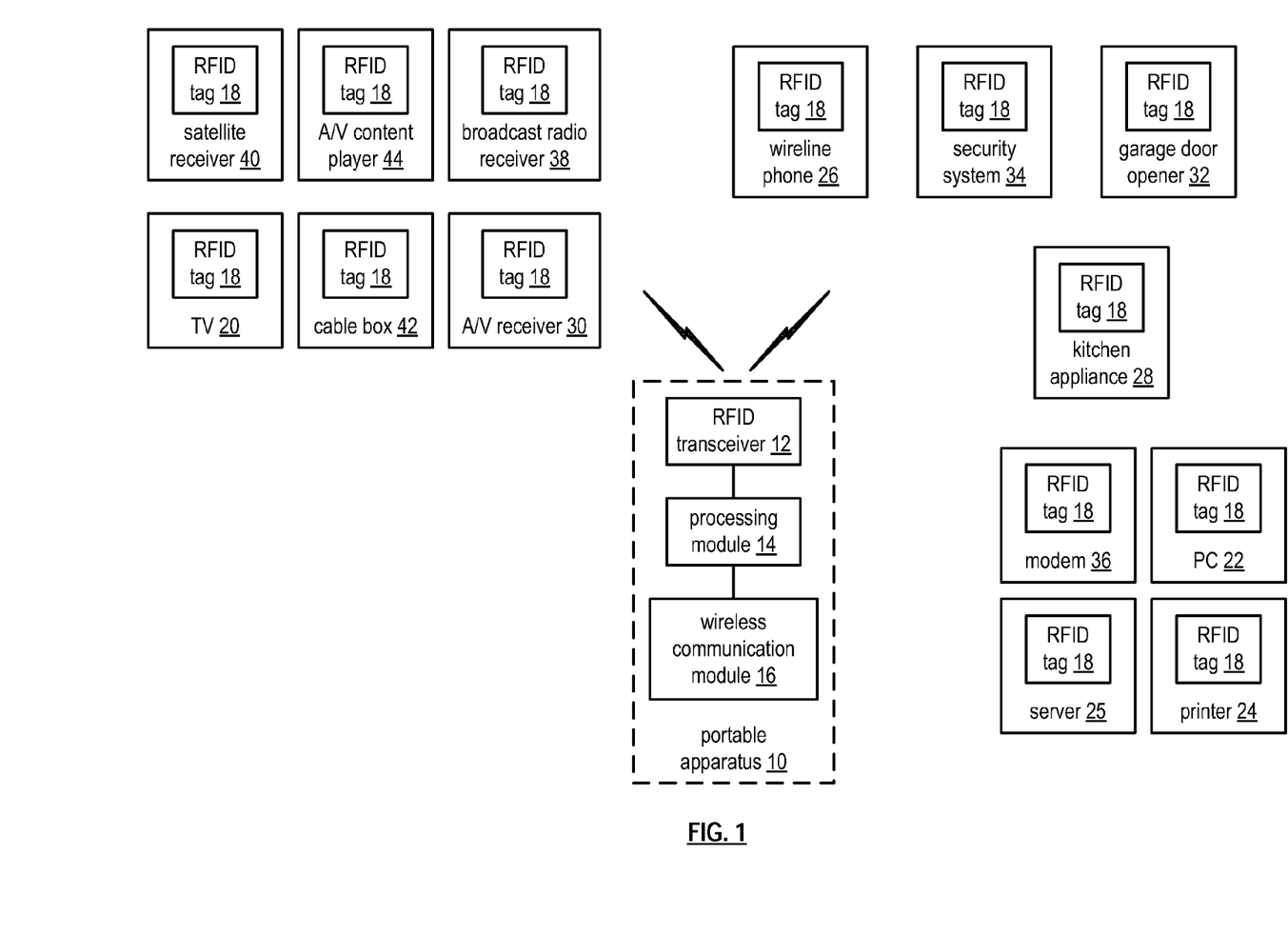
FIG. 1 is a schematic block diagram of an embodiment of a wireless communication system in accordance with the present invention.

FIG. 1 is a schematic block diagram of an embodiment of a wireless communication system that includes a portable apparatus 10 and a plurality of devices 20-44. The portable apparatus 10 includes a radio frequency identification (RFID) transceiver 12, a processing module 14, and a wireless communication module 16. Each of the devices 20-44 includes an RFID tag 18 and may be a television 20, a personal computer 22, a printer 24, a server 25, a wireline phone 26, a kitchen appliance 28 (e.g., refrigerator, coffee maker, etc.), an audio/video (A/V) receiver 30, a garage door opener 32, a security system 34, a modem 36, a broadcast radio receiver 38, a satellite receiver 40, a cable box 42, and/or an A/V content player 44 (e.g., DVD player, VCR, video game console, etc.). In addition, one or more of the devices 20-44 may include a wireless receiver or a wireless transceiver.

In an example of operation, the portable apparatus 10, which may be a cellular telephone, universal remote controller, laptop computer, handheld computer, portable audio/video player, etc., receives an RFID signal from devices within range of the apparatus 10. The RFID signals include communication information regarding the device. For example, the communication information may include wireless communication protocol, device identification information, a wireless remote control protocol, one or more programming codes, a remote control instruction set, one or more device keys, and/or wireless audio/video input ports. Note that a device may periodically transmit its RFID signal or it may transmit the signal in response to a polling request signal generated by the processing module 14 and converted into an outbound RFID signal by the RFID transceiver 12.

The RFID transceiver 12, which may be an RFID reader, extracts the communication information from the RFID signals and provides it to the processing module 14. The processing module 14 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-13.

The processing module 14 interprets the communication information to determine the wireless communication capabilities of the device (e.g., does it have an infrared and/or radio frequency (RF) receiver for remote control operations, does it further include a wireless transceiver for data communications, etc.). The processing module 14 controls storage of the communication information, which may be temporarily stored or permanently stored. For example, the apparatus 10 may only store the communication information for a device 20-44 when it is in range. When a device is out of range (e.g., loss of RFID communication and/or of wireless communication), the processing module 14 controls deletion of the stored communication information or controls overwriting of the stored communication information with communication information of another device.

In addition, the processing module 14 generates user interface data regarding at least some of the communication options with a device 20-44 and/or remote control functions of the device. When the processing module 14 receives a request, via a user input, it processes the request to produce outbound data. The processing may be interpreting the request to identify a particular remote control command, to convert the request into a particular format for wireless transmission, etc.

The wireless communication module 16, which may include one or more wireless transmitters and/or one or more wireless transceivers, converts the outbound data into an outbound wireless signal that is sent to the device. In this manner, communication information of a device 20-44 may readily be conveyed to the apparatus 10 with little or no direct user involvement.

Figure 2:
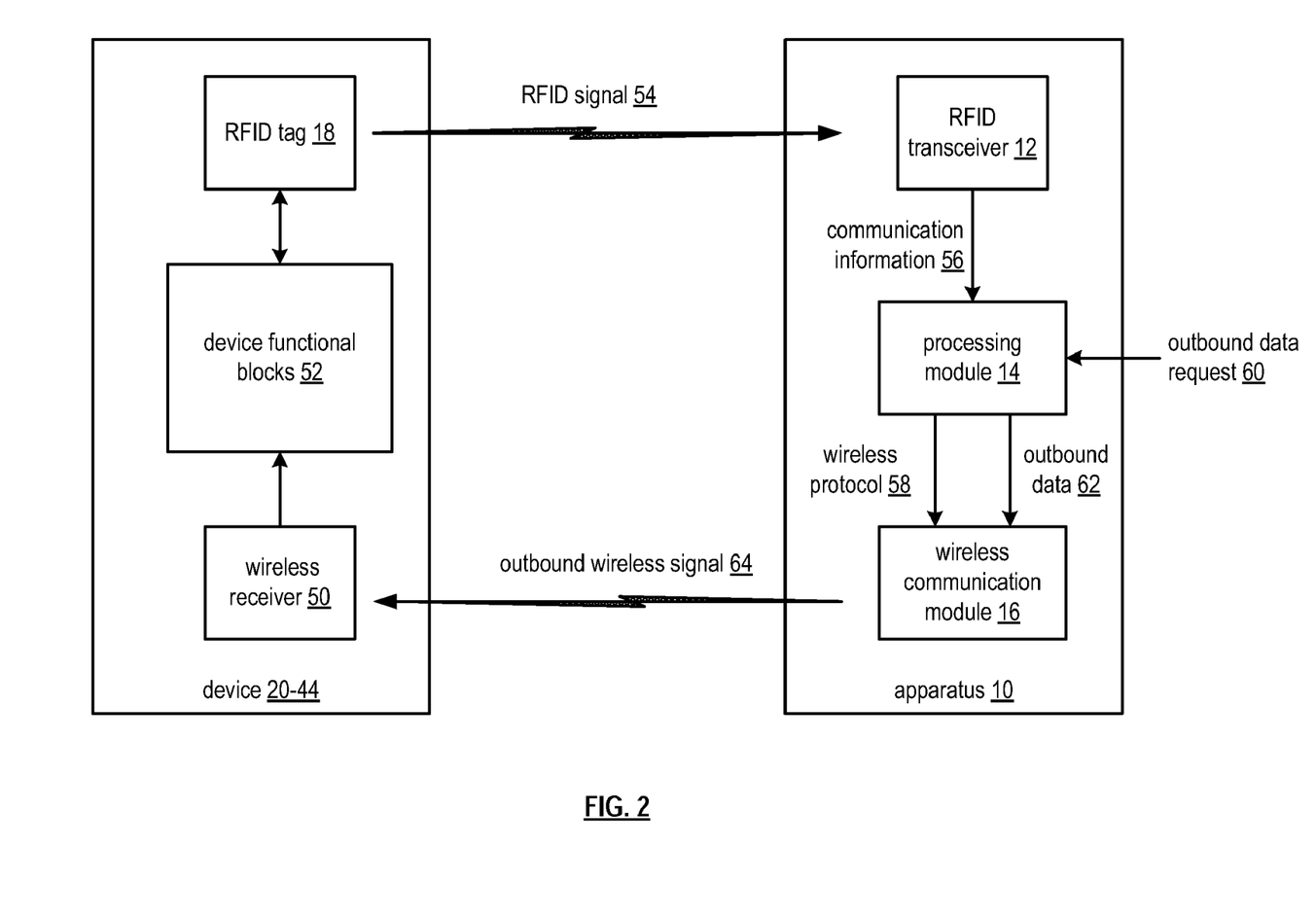
FIG. 2 is a schematic block diagram of an embodiment of a wireless device and a portable apparatus in accordance with the present invention.

FIG. 2 is a schematic block diagram of an embodiment of a wireless device 20-44 and a portable apparatus 10. The portable apparatus 10 includes the RFID transceiver 12, the processing module 14, and the wireless communication module 16. The device 20-44 includes the RFID tag 18, a wireless receiver 50, and device functional blocks 52. Note that the RFID transceiver 12, the processing module 14 and the wireless communication module 16 may be implemented on one or more integrated circuits.

In an example of operation, the RFID transceiver 12 receives an RFID signal 54 from the RFID tag 18. The RFID tag 18 may have transmitted the signal in response to a request it received from the RFID transceiver 12, periodically, or in response to a request received by the device. The RFID transceiver 12 converts the RFID signal 54 into a baseband signal to obtain communication information 56 within the RFID signal 54.

The processing module 14 determines a wireless communication protocol and device identification information from the communication information 56. For example, the wireless communication protocol may be related to an infrared communication protocol (e.g., IrDA) and/or an RF communication protocol (e.g., Bluetooth, IEEE 802.11, etc.). The processing module 14 provides the wireless protocol 58 to the wireless communication module 16 such that it can configure itself to support a communication with the device in accordance with the wireless communication protocol 58.

The wireless communication module 16 (of which various embodiments will be discussed in greater detail with reference to FIGS. 6 and 7) may include a plurality of types of transmitters and/or transceivers to support a variety of wireless communication protocols. Alternatively, or in addition to, the wireless communication module 16 may include configurable circuitry to provide a transmitter or transceiver to support the particular wireless communication protocol 58.

In addition to providing the wireless communication protocol 58 to the wireless communication module 16, the processing module 14 receives an outbound data request 60. The request 60 may be for a remote control function (e.g., change the channel, increase/decrease the volume, stop, play, pause, etc.) of the device. The processing module 14 processes the request 60 to generate outbound data 62, which includes at least a portion of the identification information (e.g., the ID code and/or keys of the device).

The wireless communication module 16 converts the outbound data 62 into an outbound wireless signal 64 in accordance with the wireless communication protocol. For example, the wireless signal 64 may be an infrared signal or an RF signal. In either case, the wireless receiver 50 (e.g., an IR receiver and/or an RF receiver) receives the outbound wireless signal 64. The wireless receiver 50 interprets the signal 64 to verify that it is for the corresponding device. If it is, the wireless receiver 50 processes the signal to extract the request.

The wireless receiver 50 provides the request to the device functional blocks 52 (e.g., volume control, channel change circuitry, DVD functionality, digital video recorder functionality, etc.). One or more of the device functional blocks 52 processes the request to effect the desired response.

Figure 3:
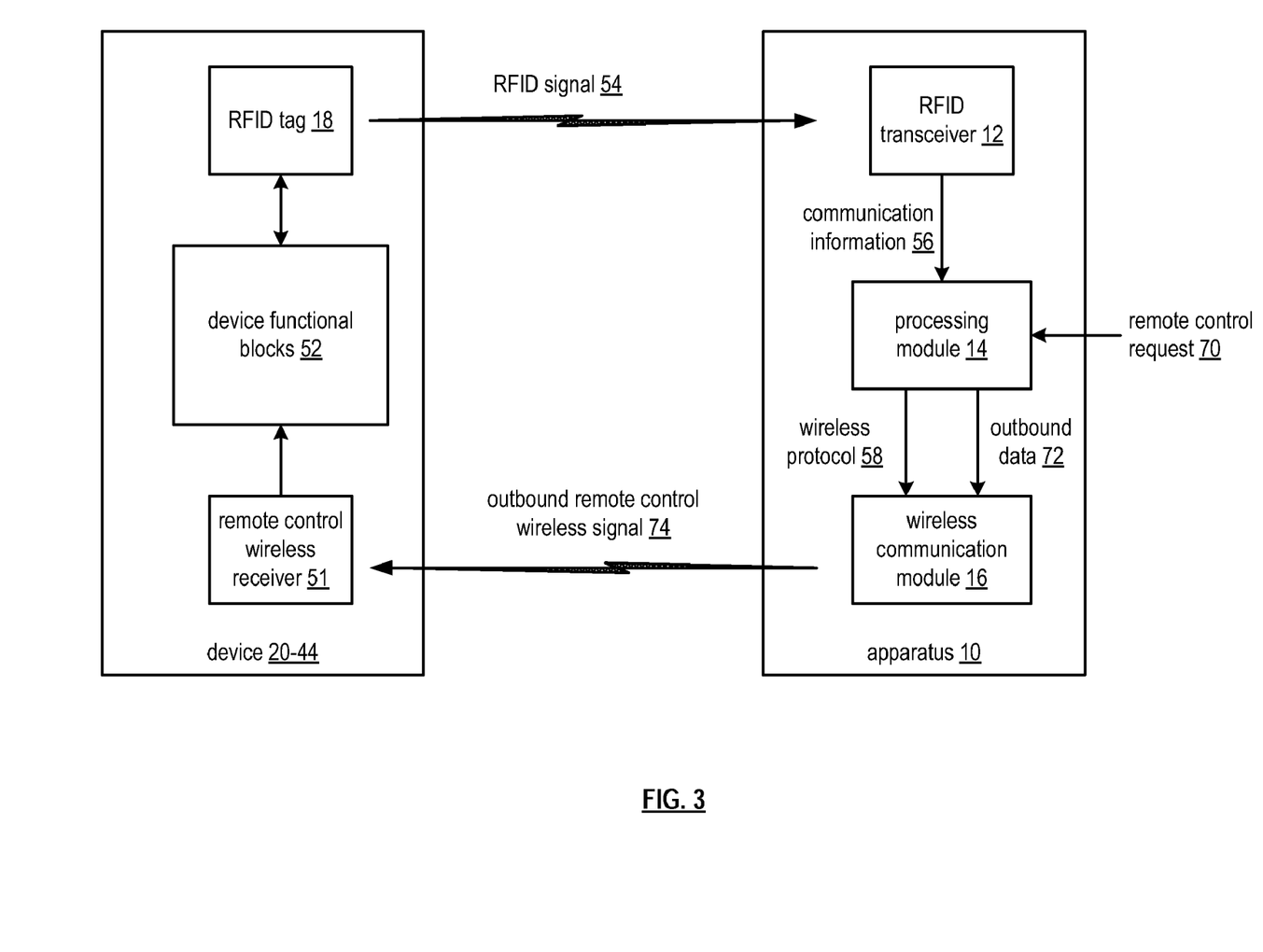
FIG. 3 is a schematic block diagram of an embodiment of a wireless device and a portable apparatus in accordance with the present invention.

FIG. 3 is a schematic block diagram of an embodiment of a wireless device 20-44 and a portable apparatus 10. The portable apparatus 10 includes the RFID transceiver 12, the processing module 14, and the wireless communication module 16. The device 20-44 includes the RFID tag 18, a wireless receiver 50, and device functional blocks 52. Note that the RFID transceiver 12, the processing module 14 and the wireless communication module 16 may be implemented on one or more integrated circuits.

In an example of operation, the RFID transceiver 12 receives an RFID signal 54 from the RFID tag 18. The RFID tag 18 may have transmitted the signal in response to a request it received from the RFID transceiver 12, periodically, or in response to a request received by the device. The RFID transceiver 12 converts the RFID signal 54 into a baseband signal to obtain communication information 56 within the RFID signal 54. In this example, the communication information 56 includes the wireless communication protocol, the device identification information, one or more programming codes, a remote control instruction set, and/or one or more device keys for remote control operation of the device.

The processing module 14 controls storage of the communication information 56. When the processing module 14 receives a remote control request 70, it verifies that it is an appropriate request for the device (e.g., is the request in the stored remote control instruction set). If so, the processing module 14 converts the remote control programming request into the outbound data 72. The wireless communication module 16 converts the outbound data 72 into an outbound remote control wireless signal 74 in accordance with the wireless communication protocol 58.

Figure 4:
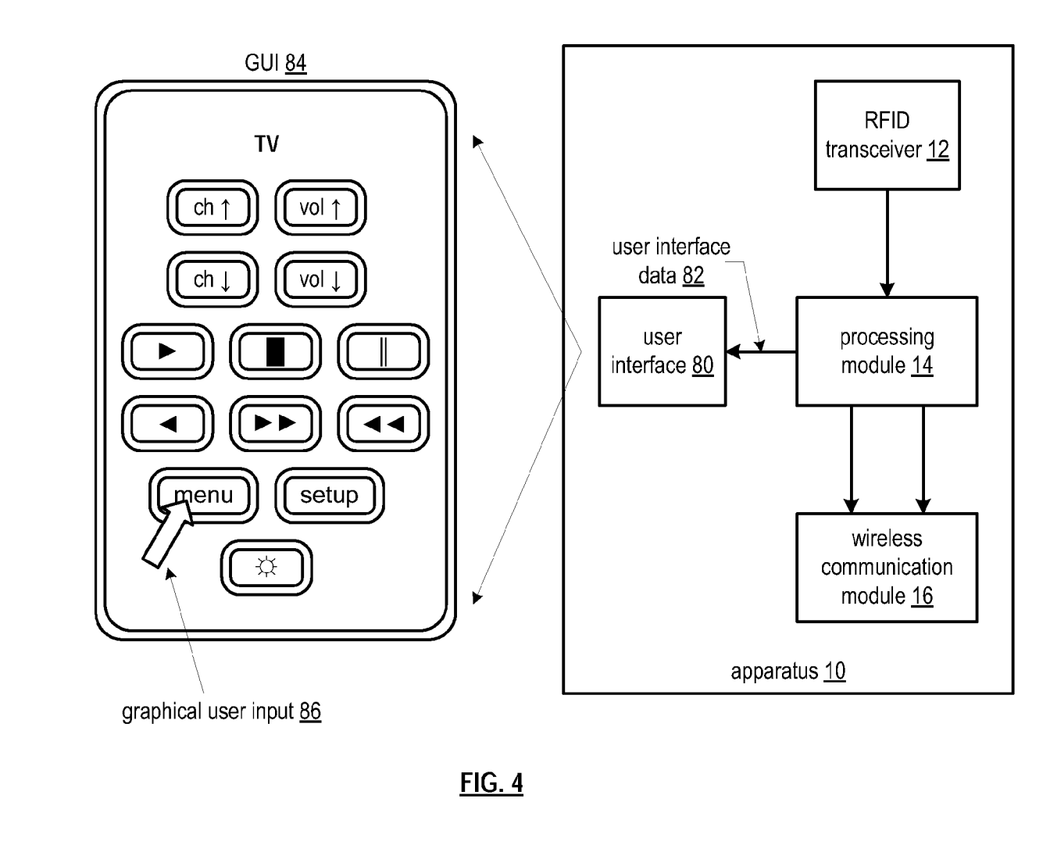
FIG. 4 is a schematic block diagram of an embodiment of a portable apparatus in accordance with the present invention.

FIG. 4 is a schematic block diagram of an embodiment of a portable apparatus 10 that includes the RFID transceiver 12, the processing module 14, the wireless communication module 16 and a user interface 80. The user interface 80 may be a video graphics processor and a touch screen display, and a display and keypad, and/or a display and other input means (e.g., keyboard, voice recognition, optical tracking, etc.).

In an example of operation, the processing module 14 generates user interface data 82 that corresponds to at least a portion of a remote control instruction set for a particular device. The user interface 80 produces a graphical user interface 84 from user interface data 82 and subsequently displays the graphical user interface (GUI) 84. In this example, the GUI 84 is for a television (TV) that includes remote control functions of channel up, channel down, volume up, volume down, play, stop, pause, reverse, fast forward, fast reverse, menu, setup, brightness, etc. Note that the user interface data 82 may be generated in response to a request for displaying the TV GUI. Such a response may be received via the user interface 80 from a higher level GUI, which shows icons of the various devices that the apparatus 10 can function as their remote controller.

At some point in time, the user interface 80 receives a graphical user input 86 from the TV GUI 84. The user interface 80 forwards the input 86 to the processing module 14. Such forwarding may include a format conversion, signal level adjustment, buffering, drive circuit signal processing, etc. The processing module 14 interprets the graphical user input 86 based on the remote control instruction set. When the graphical user input 86 corresponds to an instruction of the remote control instruction set, the processing module 14 generates the outbound data in accordance with the instruction.

Figure 5:
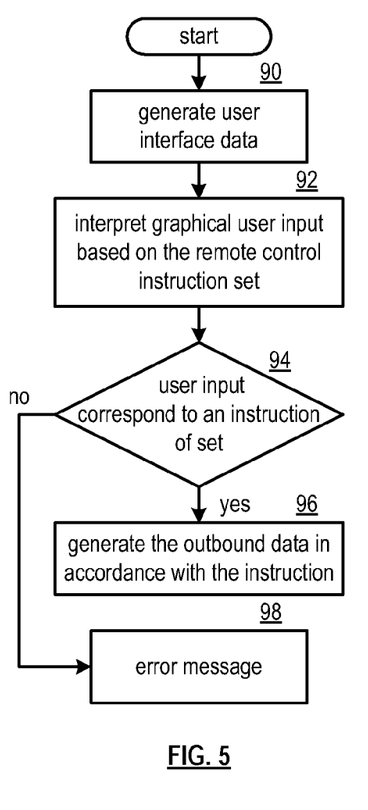
FIG. 5 is a logic diagram of an embodiment of a method for user interface data in accordance with the present invention.

FIG. 5 is a logic diagram of an embodiment of a method that begins at step 90 where the processing module generates user interface data that corresponds to at least a portion of the remote control instruction set. For example, the user interface data may include a graphical icon for some, or all, of the instructions in the instruction set. The method continues at step 92 where the processing module interprets a graphical user input based on the remote control instruction set. The method continues at step 94 where the processing module determines whether the graphical user input corresponds to an instruction of the remote control instruction set. If not, an error message is generated at step 98.

If the graphical user input corresponds to an instruction of the remote control instruction set, the method continues at step 96 where the processing module generates the outbound data in accordance with the instruction. For example, if the input is to increase the volume, the outbound data corresponds to the instruction of the instruction set for increasing the volume. For an infrared communication, the increase volume instruction may have a particular pulse position pattern. In this instance, the outbound data corresponds to the particular pulse position pattern.

Figure 6:
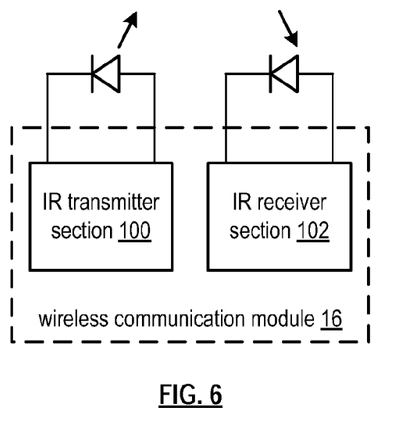
FIG. 6 is a schematic block diagram of an embodiment of a wireless communication module in accordance with the present invention.

FIG. 6 is a schematic block diagram of an embodiment of a wireless communication module 16 that includes an infrared (IR) transmitter section 100 and may further include an IR receiver section 102. The IR transmitter section 100 is coupled to a light emitting diode, or other optical transmitter, and the IR receiver section 102 is coupled to a light receiving diode, or other optical receiver. In an embodiment, the IR transmitter section 100 and the IR receiver section 102, if included, are constructed in accordance with a particular IrDA (infrared data association) protocol (e.g., IrPHY, IrLAP, IrLMP, IrCOMM, Tiny TP, IrOBEX, IrLAN, and/or IrSimple). Alternatively, the IR transmitter section 100 and the IR receiver section 102, if included, may be configurable sections such that they can be configured to support one of a plurality of the IrDA standards.

Figure 7:
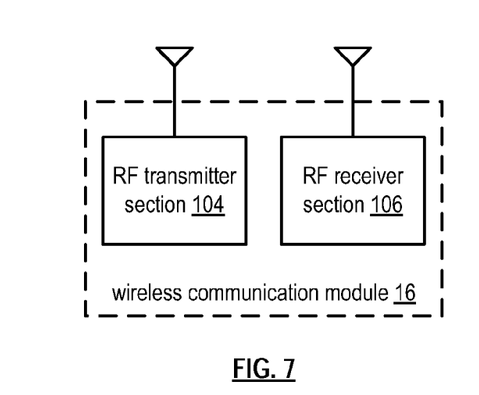
FIG. 7 is a schematic block diagram of another embodiment of a wireless communication module in accordance with the present invention.

FIG. 7 is a schematic block diagram of another embodiment of a wireless communication module 16 that includes a radio frequency (RF) transmitter section 104 and may further include an RF receiver section 106. The RF transmitter section 104 is coupled to one or more antennas and the RF receiver section 106 is coupled to the same antenna(s) or a different antenna or antennas. In an embodiment, the RF transmitter section 104 and the RF receiver section 106, if included, are constructed in accordance with a particular wireless communication protocol (e.g., Bluetooth, WiMax, ZigBee, etc.). Alternatively, the RF transmitter section 104 and the RF receiver section 106, if included, may be configurable sections such that they can be configured to support one of a plurality of the wireless communication standards. Note that the transmitter section 104 and the receiver section 106, if included, may operate in the RF frequency range of 30 HZ to 3 GHz and/or in the microwave frequency range of 3 GHz to 300 GHz.

Figure 8:
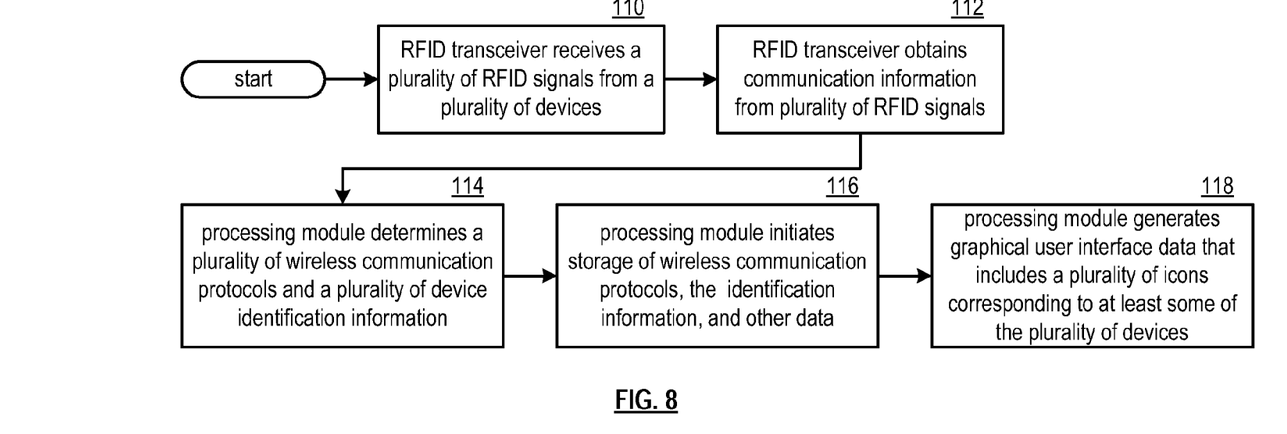
FIG. 8 is a logic diagram of an embodiment of a method for wireless communications in accordance with the present invention.

FIG. 8 is a logic diagram of an embodiment of a method for wireless communications that begins at step 110 where the RFID transceiver receives a plurality of RFID signals from a plurality of devices. The method continues at step 112 where the RFID transceiver obtains a plurality of communication information from the plurality of RFID signals. In an embodiment, the RFID transceiver extracts the communication information from the RFID signals for each of the devices. The communication information may include wireless communication protocol, device identification information, a wireless remote control protocol, one or more programming codes, a remote control instruction set, one or more device keys, and/or wireless audio/video input ports.

The method continues at step 114 where the processing module determines a plurality of wireless communication protocols and a plurality of device identification information from the plurality of communication information. The method continues at step 116 where the processing module initiates storage of the plurality of wireless communication protocols, the plurality of device identification information, and other data of the plurality of communication information. The method continues at step 118 where the processing module generates graphical user interface data that includes a plurality of icons corresponding to at least some of the plurality of devices.

For example, the apparatus 10 may receive RFID signals from the TV 20, the AV content player 44, the broadcast radio receiver 38, the satellite receiver 40, the cable box 42, and the AV receiver 30 (as referenced from FIG. 1). For each of these devices, the processing module stores its communication information (e.g. ID, codes, keys, remote control instruction set, etc.) and stored as device specific GUI (an example was shown in FIG. 4). In addition, the processing module generates icons for each of the devices for display on a higher level GUI. When a particular device is selected from the higher level GUI, the GUI for the selected device is displayed.

Figure 9:
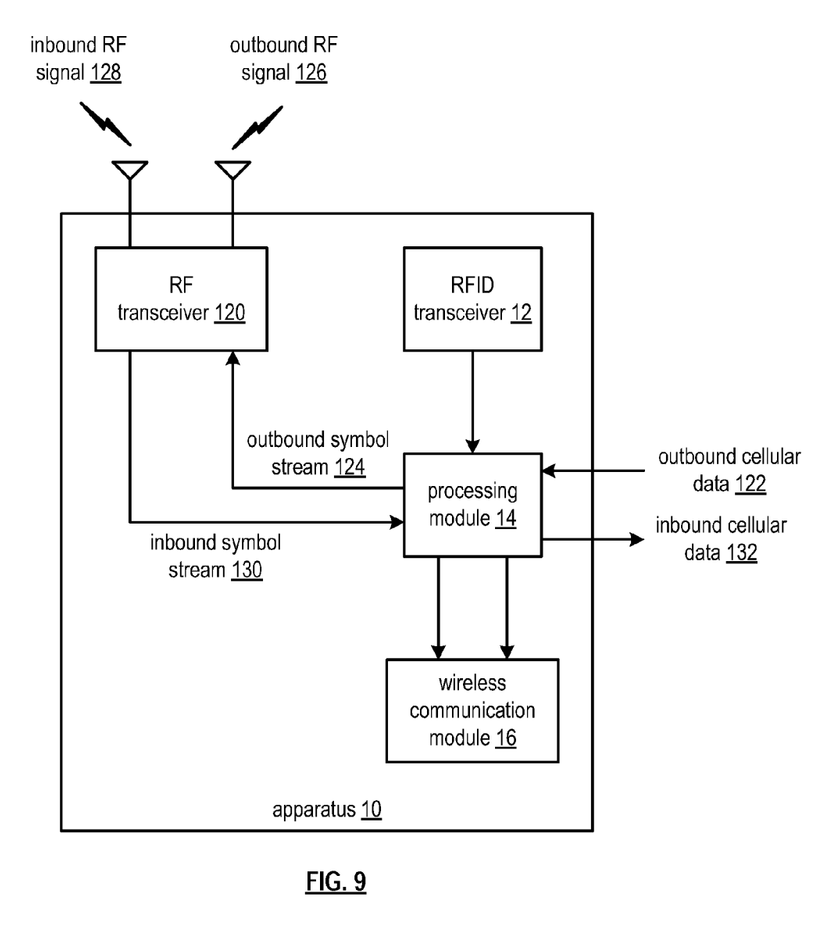
FIG. 9 is a schematic block diagram of another embodiment of a portable apparatus in accordance with the present invention.

FIG. 9 is a schematic block diagram of another embodiment of a portable apparatus 10 that includes the RFID transceiver 12, the processing module 14, the wireless communication module 16, and an RF transceiver 120. The RF transceiver 120 and the processing module 14 interoperate to provide cellular telephone functionality.

In an example of operation, the RF transceiver 120 receives an inbound RF signal 128, which is in accordance with a cellular telephone standard (e.g., GSM, WCDMA, EDGE, GPRS, HSDPA, HSUPA, etc.). A receiver section of the RF transceiver 120 converts the inbound RF signal into an inbound symbol stream 130. In an embodiment, the receiver section amplifies the inbound RF signal 128 to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The processing module 14 converts the inbound symbol stream 130 into inbound cellular data 132 (e.g., voice, text, audio, video, graphics, etc.) in accordance with the cellular telephone standard. Such a conversion may include one or more of: digital intermediate frequency to baseband conversion, time to frequency domain conversion, demodulation, constellation demapping, deinterleaving, decoding, depuncturing, and/or descrambling.

The processing module 14 also converts outbound cellular data 122 into outbound symbol stream 124 in accordance with the cellular telephone standard. Such a conversion includes one or more of: scrambling, puncturing, encoding, interleaving, constellation mapping, modulation, frequency to time domain conversion, and/or digital baseband to intermediate frequency conversion.

A transmitter section of the RF transceiver 120 converts the outbound symbol stream 130 into an outbound RF signal 126 in accordance with the cellular telephone standard. In an embodiment, the transmitter section may mix the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation]) that adjusts the amplitude of the oscillation to produce the outbound RF signal.

Figure 10:
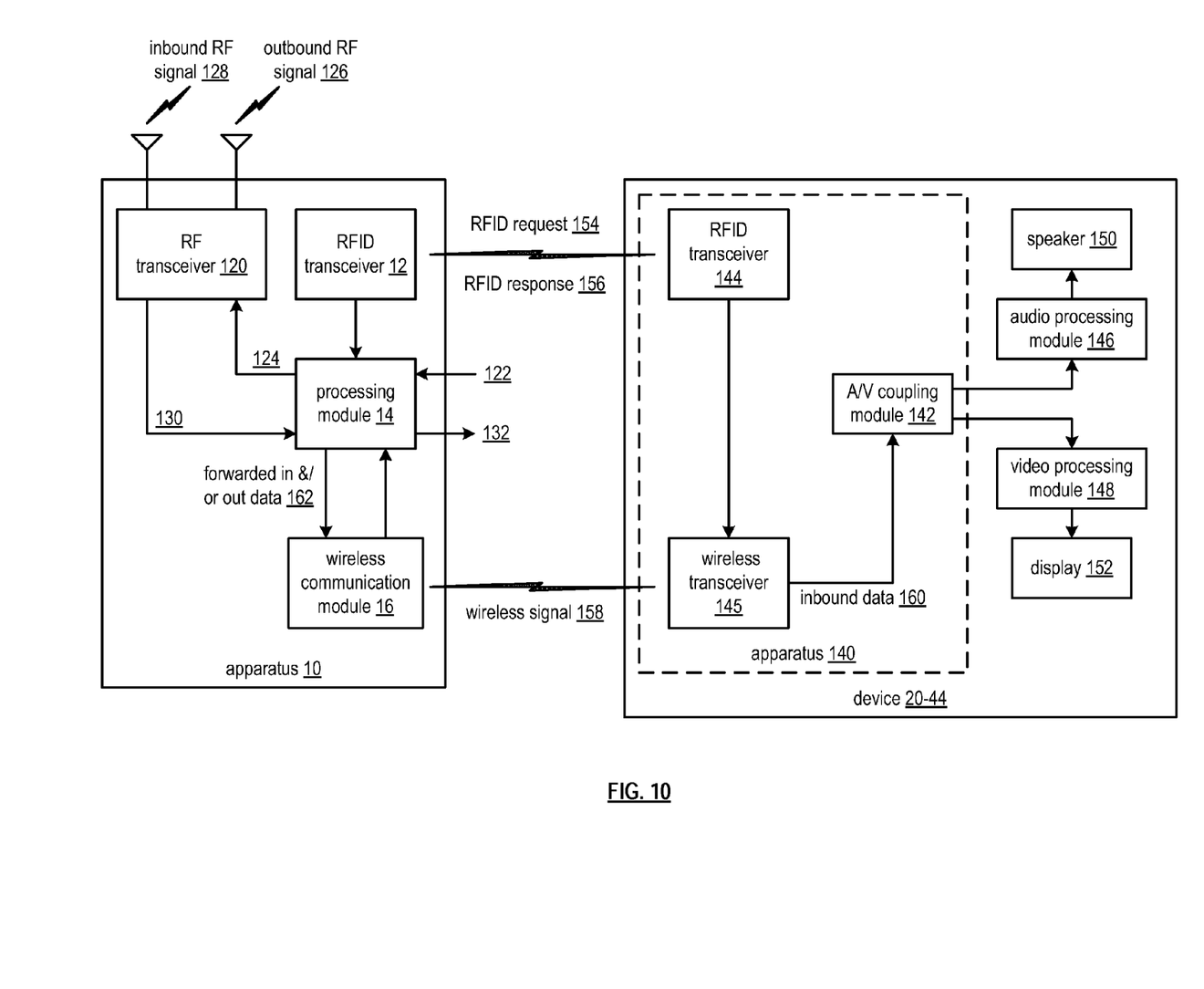
FIG. 10 is a schematic block diagram of another embodiment of a wireless device and a portable apparatus in accordance with the present invention.

FIG. 10 is a schematic block diagram of another embodiment of a wireless device 20-44 and the portable apparatus 10. The portable apparatus 10 includes the RFID transceiver 12, the processing module 14, the wireless communication module 16, and an RF transceiver 120. The device 20-44 includes an apparatus 140, an audio processing module 146 (e.g., MP3 player), a video processing module 148 (e.g., a DVD player), speakers 150, and a display 152. The apparatus 140 includes an RFID transceiver 144, an AV coupling module 142, and a wireless transceiver 145. Note that the RFID transceiver 12, the processing module 14, the RF transceiver 120, and/or the wireless communication module 16 may be implemented on one or more integrated circuits. Further note that the RFID transceiver 144, the AV coupling module 142, and the wireless transceiver 145 may be implemented on one or more integrated circuits.

In this embodiment, the apparatus 10 may provide some, or all, of the data it would present to its user to the device for display on the device 22-44. For example, if the apparatus is receiving a text message, the processing module 14 forwards the text message to the wireless communication module 16. The module 16 converts the forwarded text message into a wireless signal 158 and transmits it to the wireless transceiver 145, which may have a similar construct as the RF transceiver 120 and/or as the wireless communication module 16.

The wireless transceiver 145 recovers the text message and provides it to the display 152 via the AV coupling module 142 and the video processing module 148. In this manner, text messages may be displayed on the TV 20, or other device, for easier reading, storage, etc. The TV may process the text message as an interrupt, stopping whatever was being displayed, or as an overlay.

As another example, if the apparatus 10 is participating in a cellular telephone call, the received audio portion may be forwarded to a device for presentation on the speakers 150. Further, the microphone (not shown) of the device may be used to receive outgoing audio, which is forwarded to the apparatus 10 via the wireless communication link between the wireless communication module 16 and the wireless transceiver 145.

In this embodiment, the RFID transceiver 12 is operable to receive an RFID signal from a device and obtain communication information from the RFID signal as previously discussed. The RF transceiver 120 is operable to convert an inbound RF signal 128 into an inbound symbol stream 130 and convert an outbound symbol stream 124 into an outbound RF signal 124 as previously discussed.

The processing module 14 is operable to determine a wireless communication protocol and device identification information from the communication information (e.g., the wireless communication protocol, wireless remote control protocol, the device identification information, one or more programming codes, a remote control instruction set, one or more device keys and wireless audio/video input ports), convert outbound data 122 into the outbound symbol stream 124, and convert the inbound symbol stream 130 into inbound data 132 as previously discussed. The processing module 14 also converts at least a portion of the inbound data into forwarded outbound data 162 (e.g., a forwarded text message or received audio in a cell phone call). The wireless communication module 16 converts the forwarded outbound data 162 (e.g., audio data, voice data, video data, graphics data, and text message data) into an outbound wireless signal 158 in accordance with the wireless communication protocol.

In an embodiment of the apparatus 140, the RFID transceiver 144, which may be an RFID tag and/or an RFID reader, is operable to receive an RFID request 154 and to generate a response to the RFID request 156. For example, the request 154 may request the communication information of the device and the response 156 includes at least one of a wireless remote control protocol, a wireless communication protocol, and information regarding the device.

The wireless transceiver 145 is operable to convert the wireless signal 158 into inbound data 160 in accordance with the wireless communication protocol. The audio/video coupling module 142, which may be an AV jack, a circuit, etc., is operable to output the inbound data 160 to an audio/video input of the device (e.g., to the audio processing module 146 and/or the video processing module 148).

Figure 11:
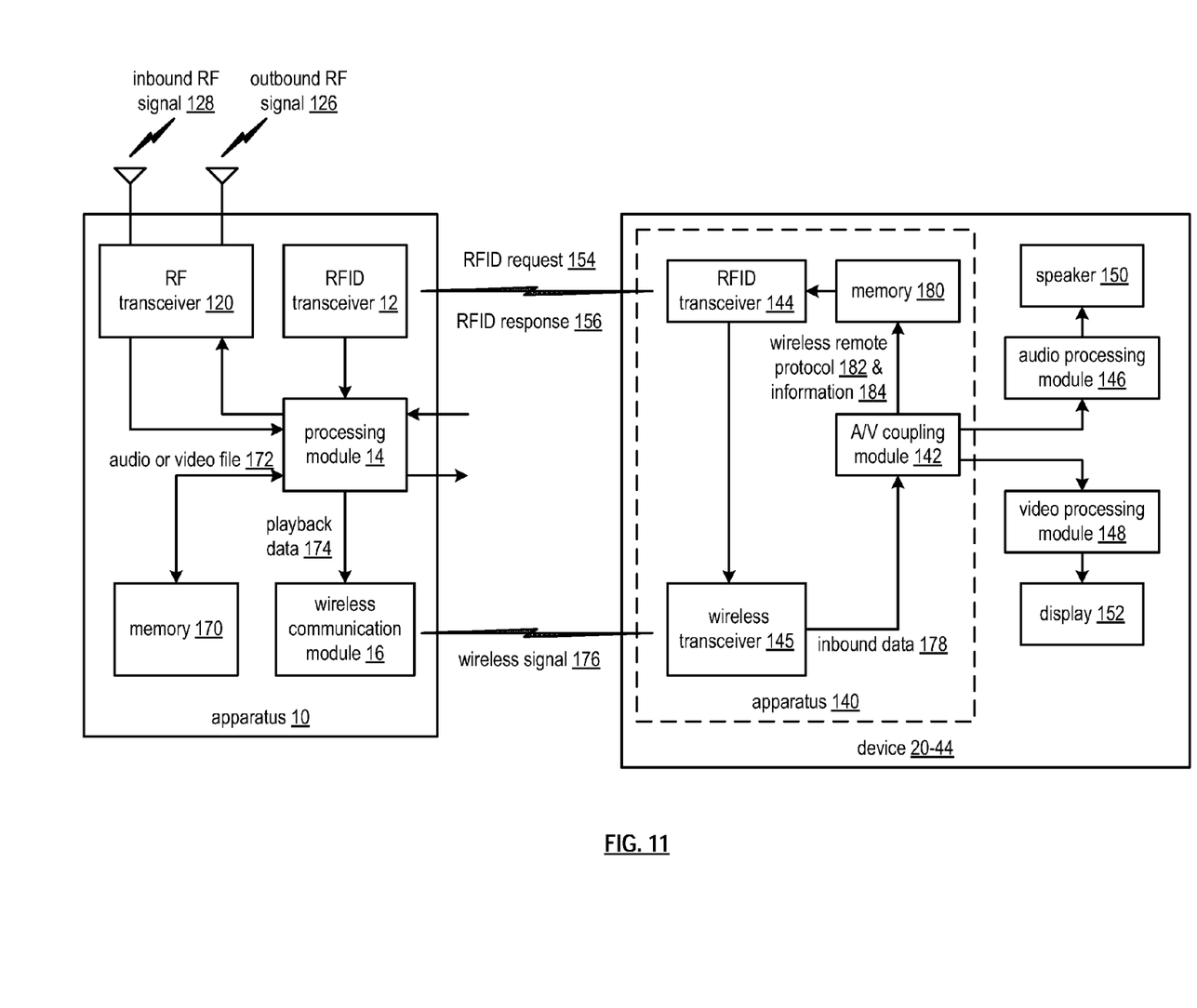
FIG. 11 is a schematic block diagram of another embodiment of a wireless device and a portable apparatus in accordance with the present invention.

FIG. 11 is a schematic block diagram of another embodiment of a wireless device 20-44 and the portable apparatus 10. The portable apparatus 10 includes the RFID transceiver 12, the processing module 14, the wireless communication module 16, memory 170, and an RF transceiver 120. The device 20-44 includes an apparatus 140, an audio processing module 146 (e.g., MP3 player), a video processing module 148 (e.g., a DVD player), speakers 150, and a display 152. The apparatus 140 includes an RFID transceiver 144, an AV coupling module 142, and a wireless transceiver 145. The apparatus 10 and the apparatus 140 operate as previously discussed with the further functioning described below.

In an example of further operation, the processing module 14 detects a playback mode of the apparatus (e.g., play a digital audio file [e.g., MP3 file] or play a video file [e.g., MPEP, JPEG]). In this mode, the processing module 14 retrieves an audio file or video file 172 from the memory 170, which may be volatile or non-volatile memory. The processing module 14 then converts at least a portion of the audio file or video file 172 into playback outbound data 174. The wireless communication module 16 converts the playback outbound data 174 into a playback outbound wireless signal 176. The apparatus 140 recovers the playback data 178 and provides it to the audio processing module 146 and/or the video processing module 148.

In another example of further operation, the audio/video coupling module 142 receives a wireless remote control protocol and the communication information regarding the device from the device. Memory 180 stores the wireless remote control protocol 182 and the communication information 184 regarding the device. In response to a request, or initiating an RFID communication, the RFID transceiver 144 retrieves the wireless remote control protocol 182 and the communication information 184 from the memory. The RFID transceiver 144 converts the retrieved information into an RFID signal 154 or 156, which is provided to the RFID transceiver 12 of the apparatus 10.

Figure 12:
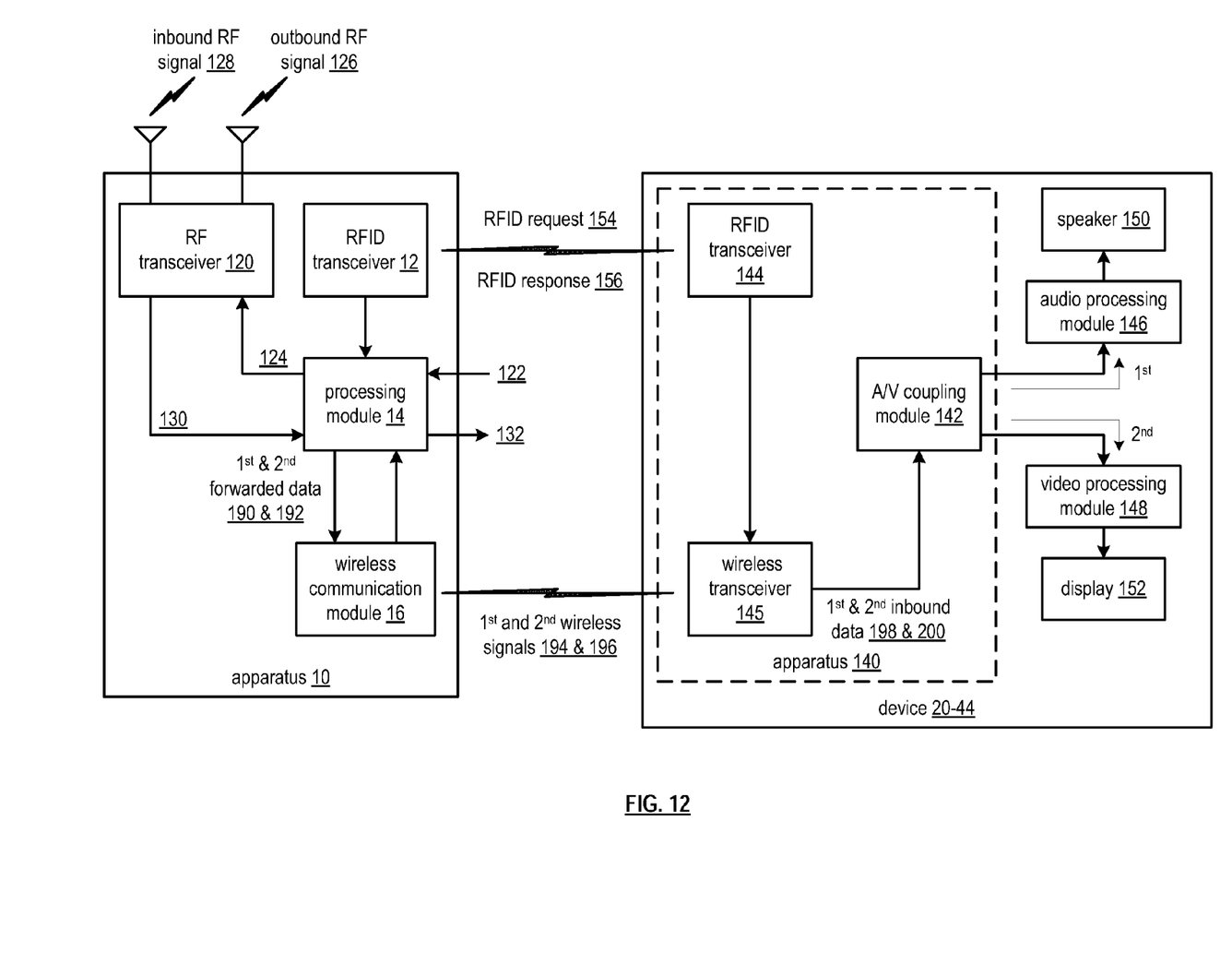
FIG. 12 is a schematic block diagram of another embodiment of a wireless device and a portable apparatus in accordance with the present invention.

FIG. 12 is a schematic block diagram of another embodiment of a wireless device 20-44 and the portable apparatus 10. The portable apparatus 10 includes the RFID transceiver 12, the processing module 14, the wireless communication module 16, and an RF transceiver 120. The device 20-44 includes an apparatus 140, an audio processing module 146 (e.g., MP3 player), a video processing module 148 (e.g., a DVD player), speakers 150, and a display 152. The apparatus 140 includes an RFID transceiver 144, an AV coupling module 142, and a wireless transceiver 145. The apparatus 10 and the apparatus 140 operate as previously discussed with the further functioning described below.

In another example of operation, the processing module 14 converts a first portion of the inbound data into first forwarded outbound data 190 and convert a second portion of the inbound data into second forwarded outbound data 192. For example, the apparatus may receive a text message while involved in a cellular telephone call. The wireless communication module 16 converts the first forwarded outbound data 190 into a first outbound wireless signal 194 in accordance with the wireless communication protocol and converts the second forwarded outbound data 192 into a second outbound wireless signal 196 in accordance with a second wireless communication protocol.

Within the device, the apparatus converts the wireless signals 194 and 196 into inbound data 198 and 200. The AV coupling module 142 provide the 1st inbound data 198 (e.g., the voice data of a phone call) to the audio processing module 146 and the second inbound data 200 (e.g., a text message) to the video processing module 148.

Figure 13:
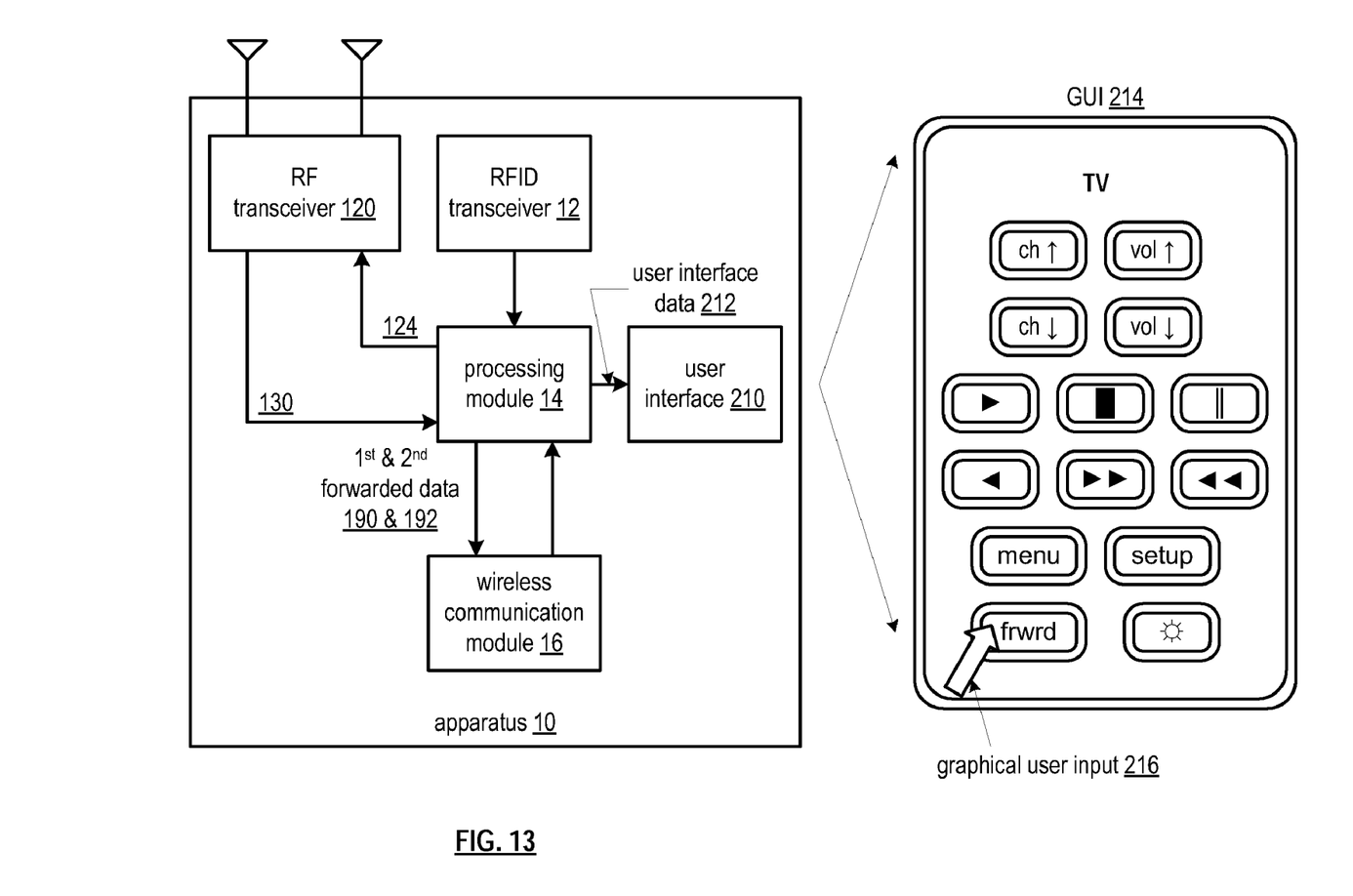
FIG. 13 is a schematic block diagram of another embodiment of a portable apparatus in accordance with the present invention.

FIG. 13 is a schematic block diagram of another embodiment of a portable apparatus 10 that includes the RFID transceiver 12, the processing module 14, the wireless communication module 16, an RF transceiver 120 and a user interface 210, which may include a video graphics processor and a touch screen display, a display and keypad, etc. The apparatus 10 operates as previously discussed with the further functioning described below.

In a further example of operation, the processing module determines the wireless remote control protocol from the communication information and generates the user interface data 212 corresponding to at least a portion of the remote control instruction set and forwarding options (e.g., forward all or a portion of the inbound and/or outbound data to the device). The user interface 210 produces a graphical user interface 214 from user interface data 212 and displays the graphical user interface 214.

At some point in time, the user interface 210 receives a graphical user input 216, which it provides the processing module 14. The processing module 14 interprets the graphical user 216 input based on the remote control instruction set and the forwarding options. When the graphical user input 216 corresponds to an instruction of the remote control instruction set, the processing module 14 generates outbound remote control data in accordance with the instruction. When the graphical user input corresponds to a forwarding option of the forwarding options, the processing module 14 generates the forwarded outbound data 162, 174, 190 and/or 192.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. An apparatus comprises:
a radio frequency identification (RFID) transceiver operable to:
   receive an RFID signal from a device; and
   obtain communication information from the RFID signal;
a processing module operable to:
   determine a wireless communication protocol and device identification information from the communication information;

receive an outbound data request; and
generate outbound data in accordance with the outbound data request, wherein the outbound data includes at least a portion of the identification information; and
a wireless communication module operable to convert outbound data into an outbound wireless signal for transmission to the device that generated the RFID signal in accordance with the wireless communication protocol.

2. The apparatus of claim 1 further comprises the processing module operable to:
receive a remote control programming request as the outbound data request; and
convert the remote control programming request into the outbound data.

3. The apparatus of claim 1, wherein the communication information comprises at least two of:
the wireless communication protocol;
the device identification information;
one or more programming codes,
a remote control instruction set, and
one or more device keys.

4. The apparatus of claim 3 further comprises:
a user interface operable to:
produce a graphical user interface from user interface data;
display the graphical user interface; and
receive a graphical user input; and
the processing module operable to:
generate the user interface data corresponding to at least a portion of the remote control instruction set;
interpret the graphical user input based on the remote control instruction set;
when the graphical user input corresponds to an instruction of the remote control instruction set, generate the outbound data in accordance with the instruction.

5. The apparatus of claim 1, wherein the wireless communication module comprises at least one of:
an infrared transmitter;
an infrared transceiver;
a configurable infrared transmitter;
a configurable infrared transceiver;
a radio frequency (RF) transmitter;
an RF transceiver;
a configurable RF transmitter; and
a configurable RF transceiver.

6. The apparatus of claim 1 further comprises:
the RFID transceiver operable to:
receive a plurality of RFID signals from a plurality of devices, wherein the plurality of RFID signals includes the RFID signal; and
obtain a plurality of communication information from the plurality of RFID signals; and
the processing module operable to:
determine a plurality of wireless communication protocols and a plurality of device identification information from the plurality of communication information;
initiate storage of the plurality of wireless communication protocols, the plurality of device identification information, and other data of the plurality of communication information; and
generate graphical user interface data that includes a plurality of Icons corresponding to at least some of the plurality of devices for transmission to the device that generated the RFID signal.

7. The apparatus of claim 1 further comprises:
the processing module operable to generate a polling request signal; and
the RFID transceiver operable to convert the polling request signal into an outbound RFID signal.

8. The apparatus of claim 1 further comprises:
a radio frequency (RF) transceiver operable to:
convert an outbound symbol stream into an outbound RF signal; and
convert an inbound RF signal into an inbound symbol stream; and
the processing module operable to:
convert outbound cellular data into the outbound symbol stream; and
convert the inbound symbol stream into inbound cellular data.

9. The apparatus of claim 1 further comprises:
an integrated circuit that supports one or more of the RFID transceiver, the processing module, and the wireless communication module.

10. An apparatus comprises:
a radio frequency identification (RFID) transceiver operable to:
receive an RFID signal from a device; and
obtain communication information from the RFID signal;
a radio frequency (RF) transceiver operable to:
convert an inbound RF signal into an inbound symbol stream; and
convert an outbound symbol stream into an outbound RF signal;
a processing module operable to:
determine a wireless communication protocol and device identification information from the communication information;
convert outbound data into the outbound symbol stream;
convert the inbound symbol stream into inbound data; and
convert at least a portion of the inbound data into forwarded outbound data,
wherein the outbound data includes at least a portion of the identification information protocol for transmission to the device that generated the RFID signal; and
a wireless communication module operable to convert the forwarded outbound data into an outbound wireless signal in accordance with the wireless communication.

11. The apparatus of claim 10, wherein the forwarded data comprises at least one of:
audio data, voice data, video data, graphics data, and text message data.

12. The apparatus of claim 10 further comprises the processing module operable to:
detect a playback mode;
when in the playback mode:
retrieve an audio file or video file from memory; and
convert at least a portion of the audio file or video file into playback outbound data, wherein the wireless communication module converts the playback outbound data into a playback outbound wireless signal.

13. The apparatus of claim 10 further comprises:
the processing module operable to:
convert a first portion of the inbound data into first forwarded outbound data;
convert a second portion of the inbound data into second forwarded outbound data;

the wireless communication module operable to:
- convert the first forwarded outbound data into a first outbound wireless signal in accordance with the wireless communication protocol; and
- convert the second forwarded outbound data into a second outbound wireless signal in accordance with a second wireless communication protocol.

14. The apparatus of claim 10, wherein the communication information comprises at least two of:
- the wireless communication protocol;
- wireless remote control protocol;
- the device identification information;
- one or more programming codes,
- a remote control instruction set,
- one or more device keys; and
- wireless audio/video input ports.

15. The apparatus of claim 14 further comprises:
a user interface operable to:
- produce a graphical user interface from user interface data;
- display the graphical user interface; and
- receive a graphical user input; and the processing module operable to:
- determine the wireless remote control protocol from the communication information;
- generate the user interface data corresponding to at least a portion of the remote control instruction set and forwarding options;
- interpret the graphical user input based on the remote control instruction set and the forwarding options;
- when the graphical user input corresponds to an instruction of the remote control instruction set, generate outbound remote control data in accordance with the instruction; and
- when the graphical user input corresponds to a forwarding option of the forwarding options, generate the forwarded outbound data;

the wireless communication module operable to convert the outbound remote control data into an outbound remote control wireless signal in accordance with the wireless remote control protocol.

16. The apparatus of claim 10, wherein the wireless communication module comprises at least one of:
- an infrared transmitter;
- an infrared transceiver;
- a configurable infrared transmitter;
- a configurable infrared transceiver;
- a radio frequency (RF) transmitter;
- an RF transceiver;
- a configurable RF transmitter;
- a configurable RF transceiver;
- a millimeter wave (MMW) transmitter;
- a MMW transceiver;
- a configurable MMW transmitter; and
- a configurable MMW transceiver.

17. The apparatus of claim 10 further comprises:
an integrated circuit that supports one or more of the RFID transceiver, the processing module, the RF transceiver, and the wireless communication module.

* * * * *